(No Model.)

C. O. WHITE.
COIN CONTROLLED MEASURING FAUCET.

No. 410,948. Patented Sept. 10, 1889.

Witnesses
A. H. Apsuhj
Emma F. Elmore

Inventor.
Clarence O. White
By his Attorney
Jas. F. Williamson

UNITED STATES PATENT OFFICE.

CLARENCE O. WHITE, OF MINNEAPOLIS, MINNESOTA, ASSIGNOR OF PART TO CHARLES L. TRAVIS, O. A. PRAY, AND CHARLES R. CHUTE, ALL OF SAME PLACE.

COIN-CONTROLLED MEASURING-FAUCET.

SPECIFICATION forming part of Letters Patent No. 410,948, dated September 10, 1889.

Application filed May 6, 1889. Serial No. 309,681. (No model.)

*To all whom it may concern:*

Be it known that I, CLARENCE O. WHITE, a citizen of the United States, and a resident of the city of Minneapolis, county of Hennepin, State of Minnesota, have invented a certain new and useful Coin-Controlled Measuring-Faucet, of which the following is a specification, reference being had to the accompanying drawings.

My invention has for its object to provide a measuring-faucet of simple construction capable of use with or without a coin-controlling device. To this end I preferably construct the head of the faucet of two communicating sections formed integral with each other, one of which is continuous with the discharge-spout and the other of which serves as a seat for valves adapted to cut off or put the faucet into communication with the liquid contained in the reservoir. The valves are so constructed that they may be operated to open the faucet from the exterior of the tank and that they will automatically close the faucet after the channel has been held open for a certain interval of time. I preferably combine with the valves a coin-controlling device for opening the same. The coin-controlling device may be of any suitable construction adapted for the purpose.

Figure 1:
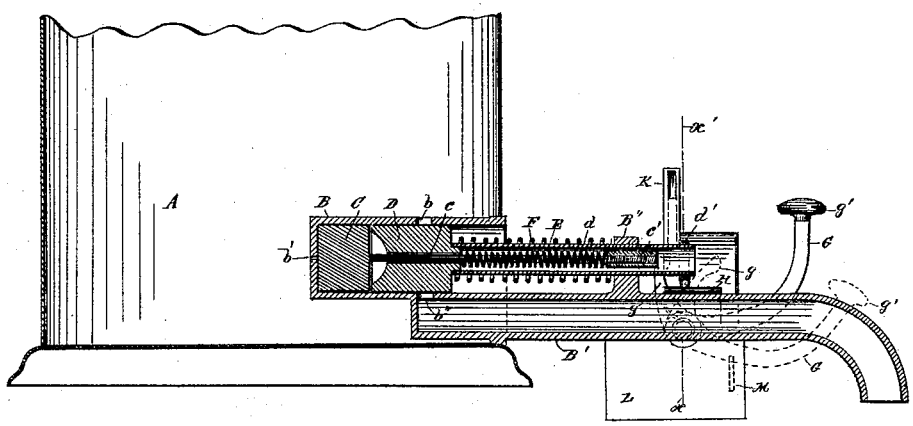
Figure 3:
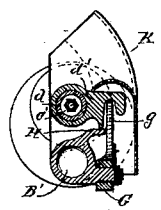
Figure 2:
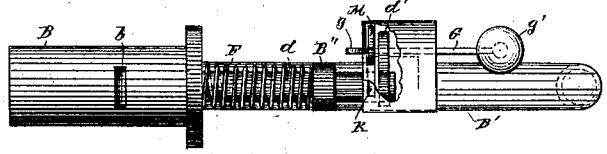
Figure 4:
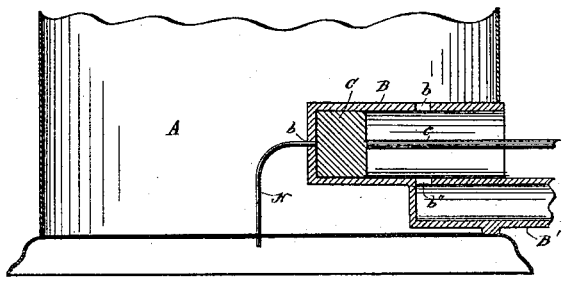

In the drawings, like letters referring to like parts throughout, Figure 1 is a vertical longitudinal section through a tank and faucet constructed in accordance with my invention. Fig. 2 is a plan view of the faucet and the coin-controlling device detached, some of the parts being broken away. Fig. 3 is a section on the line X X' of Fig. 1; and Fig. 4 is a sectional view of a modification, some of the parts being broken away.

A is the tank for containing the water or other liquid.

B B' is the faucet, of which B is the valve-seat section, and B' the discharge-spout. The valve-section is provided with openings $b$ and $b'$, and the two sections are in communication with each other through an opening $b''$ in their adjacent wall in line with the opening $b$. The section B' is provided with a vertical lug B'', having a hole in line with the axis of the valve-section B.

C and D are a pair of valves closely fitting the interior of the valve-section B. As these valves differ in their times of movement, they are hereinafter referred to as "differentially-timed" valves. Of these the valve D is provided with a hollow stem $d$, extending outward through the hole in the lug B'', and having on its extremity a transverse slotted arm $d'$. The body of the valve D has a longitudinal perforation in line with its axis. The valve C is provided with a solid stem $c$, passing through the longitudinal perforation in the valve D and extending to near the end of the hollow stem $d$. The stem $c$ is screw-threaded at its outer end, and is provided with a screw-threaded collar $c'$, working thereon.

Encircling the stem $c$ between its collar $c'$ and the end of the valve D is a coiled spring E of low tension.

Encircling the hollow stem $d$ of the valve D between the lug B'' and the end of the valve D is a coiled spring F of comparatively high tension.

Pivoted to the discharge-spout of the faucet or other support, at some convenient point, is a bell-crank lever G, one arm of which $g$ is extended upward, and is adapted to pass freely through the vertical slot in the arm $d'$ on the stem $d$, and the other arm of which is provided with a push-head $g'$.

H is a coin seat or rest, which, as shown, is an outwardly-projecting lug on the faucet directly below the arm $d'$.

K is a coin-conduit adapted to conduct the coin to the seat H between the inner end of the lever G and the inside of the arm $d'$, across the vertical slot therein.

L is a receptacle of any kind for catching the coin, said receptacle being attached in any suitable way to the discharge-spout of the faucet.

M represents a coin in position between the inner end of the lever G and the arm $d'$.

The outer end of the hollow stem $d$ of the valve D is left open for the admission of air and the adjustment of the collar $c'$ on the stem $c$.

The operation is as follows: The head of the faucet is inserted within the tank in the customary way, the relative positions of the two sections of the faucet being such as to bring the valve-section B on the inside of the tank. The opening $b'$ in the end of the valve-section B is relatively small as compared to the openings $b$ and $b''$, which are of the same size. In the absence of a coin on the seat H between the inner end of the lever G and the arm $d'$ if the push-button $g'$ be depressed, the arm $g$ will pass freely through the slot in the arm $d'$, and no effect will be produced on the valves. If, however, a coin be in position on the seat H, depression of the lever G will pull outward the stem $d$ and the valve D, throwing the faucet in communication with the tank through the openings $b$ and $b''$. In the outward movement of the valve D it passes freely over the stem of the valve C, compressing the coiled springs E and F. The valve C remains for an instant in its normal position, and is drawn forward toward the valve D by the latter's pressure on spring E with a slow movement, as the water is gradually admitted behind the same through the small opening $b'$ until it is flush against the end of the valve D, when it will close the openings $b$ and $b''$. The interval in time between the outward movement of the valve D and the following movement of the valve C may be made as short or as long as desired by properly graduating the spring E and the opening $b'$. During this interval, whatever it may be, water will fall freely through the openings $b$ and $b''$ and out through the discharge-pipe of the faucet. On releasing the lever G the spring F will force the valves back to their normal position, removing the coin from the seat H, whence it falls into the receptacle L. In other words, the principle of the faucet is difference in time between the movement of its valves. The valve D, fitting loosely on the stem $c$, permits atmospheric pressure to take effect on the outer face of the valve C, tending to hold the same in its innermost position against the spring E when the valve D is moved outward. The spring E must, therefore, be of less tension than the atmospheric pressure on the outer face of the valve C, but so graduated with reference thereto that when the water or air flows in through the opening $b'$ the spring will draw the valve C outward against the inner face of the valve D.

It is evident that instead of using the water in the tank to fill the temporary vacuum behind the valve an air-tube N might be attached to the opening $b'$ of the valve section B, extended outward through a tight joint to the exterior of the tank A, as is illustrated in Fig. 4.

It is equally evident that in case it is not desired to use the coin-controlling device with the valve D it might be operated by hand through its stem $d$. When used as a coin-controlled device, the coin-receptacle is so constructed as to incase and inclose all parts of the stem $d$.

What I claim, and desire to secure by Letters Patent of the United States, is as follows:

1. The combination, with a faucet, of valves, one moving in advance to open the induction-port and the other following to close said port, substantially as described.

2. The combination, with a faucet having a valve-seat and an induction-port, of separable valves normally held in contact to close said port and means for operating and connecting said valves, whereby, when one valve is moved to open the induction-port, it starts the other to close the same automatically, substantially as described.

3. A faucet having an induction-port and provided with separable valves for opening and closing said port, one valve following the other, as set forth, in combination with a coin-receiving chute and a pivoted lever for operating the valve mechanism when a coin is dropped into the chute, substantially as described.

4. The combination, with a faucet provided with a communicating valve-seat section, of a pair of valves in said valve-section normally in contact and closing its induction-port, the outer of said valves being loosely mounted, a spring attached to the stem of the inner valve and compressible on the stem of the inner valve by the movement of the outer valve, and an inlet behind the inner valve, substantially as described.

5. The combination, with a tank, of a faucet constructed of two communicating sections, a pair of valves in one of said sections normally in contact and closing the induction-port, the outer of said valves being loosely mounted on the stem of the inner valve and provided with a stem extending to the exterior of the tank, coiled springs on the valve-stems, compressible by the movement of the outer valve, an inlet behind the inner valve, and a coin-controlled device for operating said outer valve, substantially as described.

6. The combination, with a faucet having a valve-seat provided with an inlet-aperture and with induction and eduction ports, of valves operating to open and close said ports, substantially as set forth.

7. The combination, with a faucet provided with an induction-port and with an inlet-aperture, as set forth, of a differentially-timed valve device for opening and closing said port, substantially as described.

8. The combination, with a faucet, of valves and mechanism for operating said valves with a differential movement to open and close the induction-port, and a coin-controlled device for actuating said mechanism, substantially as described.

9. The combination, with a faucet, of the perforated valve D, having a tubular stem, the valve C, provided with a stem passing through valve D, and mechanism for operating said valves to open and close the induction-port, substantially as described.

10. The combination, with a faucet, of valves for opening and closing the induction-port, one valve being sleeved upon the stem of the other, and mechanism for operating said valves, substantially as described.

11. The combination, with a faucet, of differentially-timed valves for opening and closing its induction-port, valve-stems located one within the other, a coin-controlled device for actuating said valves, and springs for returning the valves to their normal position, substantially as set forth.

12. The combination, with a faucet having a valve-seat provided with an induction-port, of a pair of differentially-timed valves working in said seat, stems for said valves, spiral springs surrounding the stems, a device on one of the valve-stems for regulating the tension of the spring, and a coin-controlled device for actuating the valves, substantially as described.

13. The combination, with a tank, of a faucet composed of two communicating sections, a pair of valves operating in one of said sections to open and close the induction-port, the outer valve being loosely mounted on the stem of the inner valve, and being provided with a stem having on its extremity a notched or slotted arm, and a coin-controlled device for operating said valves, substantially as set forth.

14. The combination, with a faucet, of differentially-timed valves for opening and closing the induction-port, stems for said valves, springs, one of high and the other of low tension, surrounding said stems, a coin-receiving chute, and a pivoted two-armed lever for actuating the valves when a coin is dropped into the chute, substantially as set forth.

15. A faucet having a valve-seat provided with an induction-port, valves operating in said seat to open and close said port, a stem attached to the inner valve and passing through the body of the outer valve, and a spring upon said stem, whereby the outer valve can move in advance of the other to open the induction-port, substantially as set forth.

16. The combination, with a faucet having the valve-seat section B and the discharge-spout section B', of the valve C, having stem c, threaded at its outer end, the longitudinally-perforated valve D, provided with hollow stem d, the spiral springs E F, the threaded collar c', slotted arm d', coin-receiving chute K, and pivoted lever G, substantially as set forth.

17. The combination, with a faucet having an induction-port, of a differentially-timed valve device for opening and closing said port, and a coin-controlled mechanism for actuating said valve device, substantially as set forth.

CLARENCE O. WHITE.

In presence of—
  JAS. F. WILLIAMSON,
  EMMA F. ELMORE.